United States Patent [19]

Dag

[11] Patent Number: 5,549,194
[45] Date of Patent: Aug. 27, 1996

[54] ACCUMULATING CONVEYOR CHAIN

[75] Inventor: Heinrich Dag, Penzberg, Germany

[73] Assignee: Joh. Winklhofer & Sohne, Germany

[21] Appl. No.: 356,718

[22] Filed: Dec. 15, 1994

[30] Foreign Application Priority Data

Dec. 16, 1993 [DE] Germany .............................. 9319371 U

[51] Int. Cl.⁶ ...................................................... B65G 39/20
[52] U.S. Cl. ............................................ 198/845; 198/851
[58] Field of Search ..................................... 198/845, 850, 198/851

[56] References Cited

U.S. PATENT DOCUMENTS

| 1,724,150 | 8/1929 | Webb | 198/845 X |
| 2,303,587 | 12/1942 | Snyder | 198/845 X |
| 2,906,390 | 9/1959 | Hefti | 198/16 |

FOREIGN PATENT DOCUMENTS

| 0319720 | 6/1989 | European Pat. Off. | B65G 17/24 |
| 3236577 | 4/1984 | Germany | B65G 39/20 |
| 3406352 | 11/1985 | Germany | B65G 17/24 |
| 3438786 | 4/1986 | Germany | B65G 17/24 |
| 0638371 | 4/1962 | Italy | 198/851 |
| 1122585 | 11/1984 | U.S.S.R. | 198/851 |
| 2163718A | 3/1986 | United Kingdom | B65G 17/24 |

OTHER PUBLICATIONS

European Search Report (German Language), May 20, 1994.

*Primary Examiner*—James R. Bidwell
*Attorney, Agent, or Firm*—Seed and Berry LLP

[57] ABSTRACT

In an accumulating conveyor chain, which is composed of a link chain with alternating inner and outer link plates coupled via hollow or solid hinge bolts, in which the sleeves are fixed in the inner link plates and the hinge bolts rotatably traversing the sleeves are fixed in the outer link plates, and in which large-diameter conveyor rollers are mounted on sleeves predetermined along the chain length and smaller rollers are mounted at both sides on hinge bolts extended outwardly beyond their sleeves, the hinge bolts are formed in sleeves free from conveyor rollers in unextended fashion and free from rollers. The conveyor chain consists of few parts, can shift during operation and can be used universally with chain wheels for normal link chains or oblong-element chains.

9 Claims, 1 Drawing Sheet

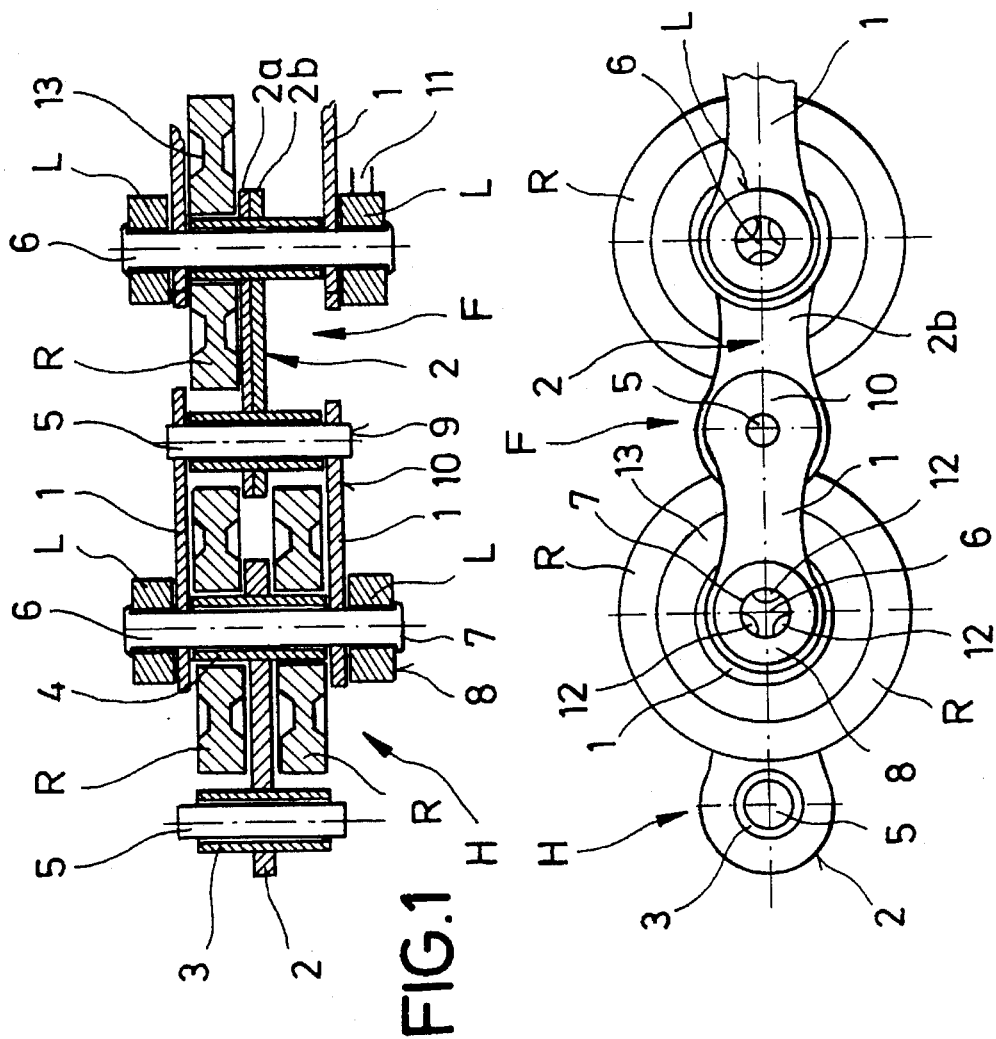

ACCUMULATING CONVEYOR CHAIN

TECHNICAL FIELD

The invention relates to an accumulating conveyor chain, and more particularly to an accumulating conveyor chain comprising a link chain with alternating inner and outer link plates coupled via hollow or solid hinge bolts.

BACKGROUND OF THE INVENTION

A plastics conveyor roller is mounted between the two inner link plates on the sleeve of each second link in a known accumulating conveyor chain. In this known accumulating conveyor chain, all hinge bolts are extended beyond the outer link plates and support a roller on both ends. In the case of a given outer dimension of the link chain, the width of each conveyor roller is limited by the inner distance between the inner link plates. The rollers on the hinge bolts disposed between respectively two conveyor rollers are not significantly loaded in the case of a load on the conveyor rollers. However, due to the underlying support for the rollers, these rollers cannot shift downwards in the case of a jam. This construction is expensive and multi-partite. The weight of the accumulating conveyor chain per length unit is relatively high. The rollers are secured against their being pulled off by means of washers, the washers being supported by the ends of the hinge bolts which are cold formed in a diameter plane.

Similar accumulating conveyor chains are known from DE-C1-34 06 352, DE-A1-34 38 786, DE-A1-32 36 577.

The invention is based on the object of providing an accumulating conveyor chain of the type mentioned at the beginning which can be manufactured at low cost and is light-weight, consists of few individual elements and can be universally used.

SUMMARY OF THE INVENTION

The set object is attained according to the invention with the features contained in the claims. In this design, no rollers are provided in the links which are not directly loaded in the case of a load of the conveyor rollers. During the conveying of objects, the main weight is passed into the customarily provided supporting frame via the conveyor rollers and the rollers allocated to them, on which the accumulating conveyor chain is supported with the rollers. Since, during operation of a conveyor device, the accumulating conveyor chain is normally under a bias, the links free from rollers do not require any support. The accumulating conveyor chain makes do with optimally few parts. Due to the omission of rollers in the free links, the accumulating conveyor chain has additional degrees of freedom during operation which make it possible that, e.g. in the case of a forced jam, the free links shift upwards and/or downwards without serious damage occurring. Due to this construction an additional elasticity results for critical operating conditions. A further advantage is the multi-purpose applicability of the accumulating conveyor chain in conveyor devices with chain wheels for normal link chains or chain wheels of oblong-element accumulating conveyor chains. Although the accumulating conveyor chain of this construction has a normal link pitch, a proper engagement ratio between the accumulating conveyor chain and a chain wheel for oblong-element conveyor chains is ensured due to the omission of the rollers in the links free from conveyor rollers. The accumulating conveyor chain is more light-weight than conventional accumulating conveyor chains of the same basic dimensions and produces a lower running noise.

Due to the displacement of the inner link plate or the pair of inner link plates to the longitudinal center of the accumulating conveyor chain, the outer limits of the running surface of the conveyor can be placed more to the outside, since the conveyor roller width is no longer limited by the distance between the inner link plates, but by the wider distance between the outer link plates. Moreover, an opened structure of the accumulating conveyor chain results which may be desirable for certain application cases.

If the full width between the outer link plates is used for conveyor rollers, then two conveyor rollers should be provided in this link. However, it is also conceivable to provide only one conveyor roller each in this link and to dispose the conveyor roller following next in the next but one link on the other side of the inner link plate or the pair of inner link plates. If large-diameter conveyor rollers are provided in each second link, then a relatively coherent conveyor surface is formed for the goods to be transported. However, it is also conceivable to enlarge the distances between the conveyor rollers in the longitudinal direction of the chain, e.g. for large and light-weight goods to be transported, in order to design the accumulating conveyor chain still in a more light-weight, movable and inexpensive fashion.

In one embodiment, sturdy inner link plates and optimally large conveyor rollers can be used, which is of advantage for specific application purposes. Moreover, a guide of the conveyor rollers is formed under extreme loads or during tilting.

In another embodiment, the accumulating conveyor chain gets very narrow between the links with the conveyor rollers and the guide surfaces on which the rollers possibly run, can be moved close together in desirable fashion without there being the risk that the free ends of the shorter hinge bolts collide with the guide surfaces or damage them during the shifting mentioned at the beginning during a forced jam.

Still another embodiment includes a further reduction of the individual components and a reduction of the total width of the chain. Due to the omission of the washers customary so far for the pull-off protection of the rollers, space is saved at each chain side. The task of the pull-off protection is directly taken over by the thickened ends. Moreover, weight is saved due to this measure and the assembly of the accumulating conveyor chain is simplified.

In still another embodiment, a reliable pull-off protection of the rollers is ensured in a manner not customary so far. Due to the upsettings or rivetings in at least diameter planes of the hinge bolts, which are staggered with respect to each other (possibly a multiple roof-type riveting) a pull-off protection of each roller, which acts almost across the entire circumference, is achieved with a relatively small upsetting.

A further embodiment requires no or only little maintenance, since the materials with self-lubricating properties ensure long service lives without damage to the accumulating conveyor chain, without the necessity of regreasing by hand or with lubricating means. The liners or sleeves responsible for the lubrication or permanent lubrication are used everywhere where components of the accumulating conveyor chain rub against each other or move relatively to each other during operation.

In a further advantageous embodiment a moulded part representing the inner link plate or the pair of inner link plates can be manufactured precisely, rigidly and possibly in light-weight fashion with modern production processes, whereby a few processing steps are saved in the production of the accumulating conveyor chain.

BRIEF DESCRIPTION OF THE DRAWINGS

Embodiments of the invention are explained by means of the drawings.

FIG. 1 shows a section of an accumulating conveyor chain in the plane of the link axis.

FIG. 2 shows a lateral view of FIG. 1 rotated by 90°.

FIG. 3 shows a section of an embodiment variant.

DETAILED DESCRIPTION OF THE INVENTION

An accumulating conveyor chain F according to FIGS. 1 and 2 is made with a conventional link chain H consisting of outer link plates 1, inner link plates 2, sleeves 3, 4 pressed into the inner link plates 2, short hinge bolts 5 rotatably mounted in the sleeves 3, 4 and pressed into the outer link plates 1 and hinge bolts 6 extended beyond the outer link plates. However, a hollow bolt link chain with hollow hinge bolts could be used instead of the hinge bolts 5 and/or 6.

Deviating from the normal construction, the one inner link plate 2 is provided in the middle between the two outer link plates 1. It is outlined in the righthand half of FIG. 1 that two inner link plates 2a, 2b form a pair of inner link plates 2. The accumulating conveyor chain F is of course either provided throughout with the inner link plate 2 or with the pair of inner link plates 2. As a detail variant, an inner link plate 2' is shown in one-partite fashion with the sleeves 3' and 4' in FIG. 3, the bores 14, 15 being either formed directly in the sleeves 3', 4' or formed subsequently, e.g. by means of punching or the like. The inner link plate 2' can e.g. be produced by means of pressing, extruding, forging and swaging, sintering or the like, namely from metallic materials, sintered materials or also from plastic material or reinforced plastic material, and possibly even from a material with self-lubricating properties.

In the shown embodiment, a conveyor roller R is disposed at each second link or two conveyor rollers R are disposed in pairs in the interspaces between the outer link plates 1 and the inner link plate 2 or the pair of inner link plates 2 or 2', which is (are) mounted freely rotatably on the sleeve 4. Rollers L are mounted freely rotatably on both free ends on the hinge bolts 6 in the sleeve 4, which are secured against being pulled off in that the ends 7 of the hinge bolts 6 designed in extended fashion are thickened directly at the front sides 8 of the rollers L by means of cold forming. Suitably an upsetting or riveting is carried out in two diameter planes of the ends 7, which are staggered with respect to each other, related to the axis of the hinge bolt 6 in order to provide a pull-off protection for the roller L on all sides (FIG. 2, reference numeral 12) for the several upsettings or rivetings, e.g. roof-type riveting, which are distributed across the end 7 in circumferential direction.

The hinge bolts 5 which are shorter than the hinge bolts 6 are pressed into the outer link plates 1—as explained. Their ends 9 are directly at the outer sides 10 of the outer link plates 1 in order to keep the chain as slender as possible.

According to FIGS. 1 and 2, the conveyor rollers R are in each case provided on each second link. However, this is not imperative, the pitch of the conveyor rollers could also be selected larger or even irregularly. It is of importance that no rollers L are provided on the shorter hinge bolts 5 which are free from conveyor rollers R.

The inner link plates or pairs of inner link plates 2, 2' must not be necessarily pressed onto the sleeves 3, 4 in the middle between the outer link plates 1, but can also be placed directly adjacent to the outer link plates 1 in conventional construction. Then a single, second conveyor roller R could be placed between the inner link plates. The hinge bolts free from conveyor rollers would nevertheless be designed without rollers L and in shorted fashion.

As outlined in the righthand half of FIG. 1, a single conveyor roller R could also be provided per sleeve 4, the conveyor rollers R being suitably staggered with respect to each other from one link to the next one or being disposed in each case at the other side of the inner link plate or the pair of inner link plates 2.

The conveyor rollers R used in the shown embodiment consist suitably of a plastic material and are provided with weight-saving recesses 13.

The conveyor rollers R consist suitably of a plastic material with self-lubricating properties so that they run with little maintenance. If conveyor rollers consisting of metal are used, self-lubricating sleeves made of plastic material are possibly pressed into them. In order to design the accumulating conveyor chain F in a fashion requiring no maintenance or at least only little maintenance, sleeves or liners of materials with self-lubricating properties are suitably provided between the components being movable with respect to each other. The sleeves 3, 4 and also the rollers L or the conveyor rollers R could be e.g. lined with liners or sleeves made of self-lubricating materials. No frictional corrosion is formed at the contact points in the links due to such self-lubricating components (sintered or plastic material). The outer edges of the running surfaces of the conveyor rollers R are adjacent to the inner sides of the outer link plates 1 so that optimally wide support areas result for the material to be conveyed on the conveyor rollers R.

I claim:

1. An accumulating conveyor chain comprising a link chain with alternating inner and outer link plates coupled via hinge bolts which are fixed in the outer link plates and rotatably traverse sleeves fixed in the inner link plates, some of the hinge bolts extending outwardly beyond their respective sleeves and the other hinge bolts being substantially the same length as their respective sleeves, large-diameter conveyor rollers being rotatably mounted on the respective sleeves of at least some of the outwardly-extending hinge bolts at predetermined positions along the link chain and smaller rollers being rotatably mounted on at least some of the outwardly-extending hinge bolts at opposing ends of the bolts outside the outer link plates, the hinge bolts which are the same length as their sleeves being without smaller rollers and being located in sleeves without conveyor rollers.

2. The accumulating conveyor chain according to claim 1, wherein each sleeve is fixed in its respective inner link plate at the approximate longitudinal centre of the sleeve spaced apart from the outer link plate attached to the hinge bolt traversing the sleeve, wherein each conveyor roller is disposed between its respective inner link plate and outer link plate.

3. The accumulating conveyor chain according to claim 2, wherein the outwardly-extending hinge bolts and same-length hinge bolts alternate, wherein at least two conveyor rollers and at least two smaller rollers are mounted on the respective sleeves of each outwardly-extending hinge bolt.

4. The accumulating conveyor chain according to claim 1, wherein the ends of the same-length hinge bolts are disposed directly at the outer sides of the outer link plates.

5. The accumulating conveyor chain according to claim 1, wherein the ends of the outwardly-extending hinge bolts are formed directly adjacent the sides of the smaller rollers in thickened fashion by means of cold forming in order to restrain each smaller roller.

6. The accumulating conveyor chain according to claim 1, wherein liners made of materials with self-lubricating properties are provided between the components of the accumulating conveyor chain which are movable relative to each other.

7. The accumulating conveyor chain according to claim 2, wherein each inner link plate together with its respective sleeves is a one-partite, shaped part.

8. The accumulating conveyor chain according to claim 2, wherein each inner link plate overlaps the respective conveyor roller of the next following inner link plate along the link chain.

9. The accumulating conveyor chain according to claim 7, wherein the ends of the outwardly-extending hinge bolts are cold formed by upsetting the ends in at least two locations each offset with respect to the longitudinal axis of the outwardly-extending hinge bolts in order to restrain the smaller rollers.

* * * * *